(12) United States Patent
Kim et al.

(10) Patent No.: US 9,746,722 B2
(45) Date of Patent: Aug. 29, 2017

(54) LIQUID CRYSTAL DISPLAY

(71) Applicant: Samsung Display Co., Ltd., Yongin, Gyeonggi-Do (KR)

(72) Inventors: Yeon-Sung Kim, Suwon-si (KR);
Seung-Won Kuk, Cheonan-si (KR);
Yun-Gun Lee, Asan-si (KR);
Hyeng-Woo Cho, Suwon-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/835,368

(22) Filed: Aug. 25, 2015

(65) Prior Publication Data

US 2016/0202527 A1    Jul. 14, 2016

(30) Foreign Application Priority Data

Jan. 8, 2015   (KR) .................. 10-2015-0002971

(51) Int. Cl.
*G02F 1/1337* (2006.01)
*G02F 1/1343* (2006.01)
*G02F 1/1339* (2006.01)
*G02F 1/1335* (2006.01)
*G02F 1/1333* (2006.01)

(52) U.S. Cl.
CPC ...... *G02F 1/134309* (2013.01); *G02F 1/1337* (2013.01); *G02F 1/1339* (2013.01); *G02F 1/133512* (2013.01); *G02F 2001/133388* (2013.01)

(58) Field of Classification Search
None
See application file for complete search history.

(56) References Cited

U.S. PATENT DOCUMENTS

| 5,513,028 | A | * | 4/1996 | Sono ................ G02F 1/133514 349/139 |
| 6,784,956 | B2 |  | 8/2004 | Matsumoto et al. |
| 6,952,246 | B2 |  | 10/2005 | Matsumoto et al. |

(Continued)

FOREIGN PATENT DOCUMENTS

| KR | 10-2009-0032812 A | 4/2009 |
| KR | 10-2009-0080404 A | 7/2009 |

(Continued)

*Primary Examiner* — Richard Kim
(74) *Attorney, Agent, or Firm* — Robert E. Bushnell, Esq.

(57) ABSTRACT

A liquid crystal display comprises: an upper panel including an upper substrate on which a plurality of thin film layers are formed; a lower panel including a lower substrate on which a plurality of thin film layers are formed; a liquid crystal layer positioned between the upper panel and the lower panel; and a sealing member bonding between the upper panel and the lower panel and constraining the liquid crystal layer. The lower panel includes an aligning agent margin part which is positioned inside the sealing member on the lower substrate and dummy pixels which are positioned at the aligning agent margin part and which enclose a display area. By this configuration, it is possible for a liquid crystal display to be capable of reducing the peripheral area of the display panel so as to expand the display area or making the peripheral area seem smaller to make the display area seem larger.

18 Claims, 6 Drawing Sheets

(56) References Cited

U.S. PATENT DOCUMENTS

| | | |
|---|---|---|
| 6,961,041 B2 | 11/2005 | Iida et al. |
| 7,567,230 B2 | 7/2009 | Iida et al. |
| 2003/0016328 A1* | 1/2003 | Chung .............. G02F 1/133512 349/149 |
| 2015/0168752 A1* | 6/2015 | Shih ...................... G02F 1/1337 349/123 |

FOREIGN PATENT DOCUMENTS

| | | |
|---|---|---|
| KR | 10-0960129 B1 | 5/2010 |
| KR | 10-2011-0012512 A | 2/2011 |
| KR | 10-1031760 B1 | 4/2011 |
| KR | 10-2012-0138609 A | 12/2012 |

* cited by examiner

LIQUID CRYSTAL DISPLAY

CLAIM OF PRIORITY

This application claims priority to and benefits accruing under 35 U.S.C. §119 from the Korean Patent Application No. 10-2015-0002971 filed in the Korean Intellectual Property Office on Jan. 8, 2015, the entire contents of which are incorporated herein by reference.

BACKGROUND OF THE INVENTION

Field of the Invention

The present invention relates to a liquid crystal display, and more particularly, to a liquid crystal display capable of reducing a peripheral area of a display panel to expand the display area or making the peripheral area seem smaller to make the display area seem larger.

Description of the Related Art

A liquid crystal display (LCD) is one of the flat panel displays (FPDs) which are currently most widely used. The liquid crystal display displays an image by applying different potentials to a pixel electrode and a common electrode of a liquid crystal panel in which a liquid crystal layer is formed between an upper panel and a lower panel to form an electric field so as to change an orientation of liquid crystal molecules and to control light transmittance depending thereon.

In the liquid crystal display panel, an area may be divided into a display area in which a real image is displayed and a peripheral area thereof. In the peripheral area of the liquid crystal display panel, the upper panel and the lower panel are bonded to each other by a sealing member enclosing the display area and a liquid crystal is injected into the sealing member. A solution including an alignment layer forming material (hereinafter, referred to as an aligning agent) is applied to the upper panel and the lower panel to form an alignment layer for orienting the liquid crystal molecules of the liquid crystal layer in a desired direction prior to bonding between the upper panel and the lower panel by the sealing member. The alignment layer is formed in the peripheral area as well as the display area due to spreadability of the aligning agent.

That is, the aligning agent and the liquid crystal are formed even in the peripheral area inside the sealing member, and the peripheral area is represented by a black color, being covered with a light blocking member and not displaying an image at all.

By doing so, the peripheral area is more extended and a size of a bezel is more expanded, so that decoration and the like of the liquid crystal display may deteriorate.

The above information disclosed in this Background section is only for enhancement of an understanding of the background of the invention, and therefore it may contain information that does not form the prior art that is already known in this country to a person of ordinary skill in the art.

SUMMARY OF THE INVENTION

The present invention has been developed in an effort to provide a liquid crystal display having the advantages of reducing a peripheral area of a display panel to expand the display area or making the peripheral area seem smaller to make the display area seem larger.

An exemplary embodiment of the present invention provides a liquid crystal display, comprising: an upper panel including an upper substrate on which a plurality of thin film layers are formed; a lower panel including a lower substrate on which a plurality of thin film layers are formed; a liquid crystal layer positioned between the upper panel and the lower panel; and a sealing member bonding between the upper panel and the lower panel and constraining the liquid crystal layer, wherein the lower panel includes an aligning agent margin part which is positioned inside the sealing member on the lower substrate; and dummy pixels which are positioned at the aligning agent margin part and which enclose a display area.

According to an exemplary embodiment of the present invention, it is possible to provide the liquid crystal display with the capability of reducing the peripheral area of the display panel so as to expand the display area or with the capability of making the peripheral area seem smaller so as to make the display area seem larger.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
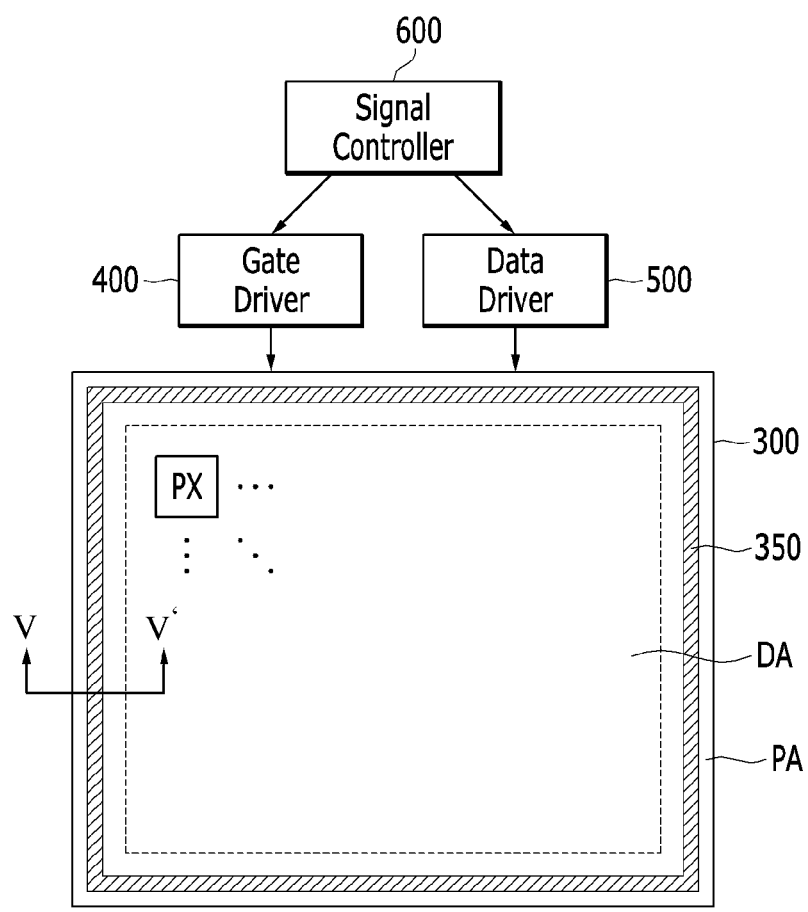
FIG. 1 is a layout view of a liquid crystal display according to an exemplary embodiment of the present invention.

Hereinafter, the present invention will be described more fully with reference to the accompanying drawings, in which exemplary embodiments of the invention are shown. As those skilled in the art will realize, the described embodiments may be modified in various different ways, all without departing from the spirit or scope of the present invention.

It is to be noted that the accompanying drawings are schematically illustrated and are not illustrated to a scale. A relative dimension and ratio of components are illustrated as exaggerated or reduced in the drawings for clarity and convenience and any dimension is only an example, and therefore it is not limited thereto. Furthermore, the same structures, elements, or parts which are illustrated in at least two drawings are denoted by the same reference numerals, which are used to indicate similar features. Mention that any portion is present "over" or "on" another portion means that any portion may be directly formed on another portion or a third portion may be interposed between one portion and another portion.

An exemplary embodiment of the present invention will be described in detail. As a result, numerous variations of exemplary embodiments are expected. Therefore, the exemplary embodiments are not limited to a specific form of the illustrated region and, for example, also include a form changed by manufacturing.

Hereinafter, a liquid crystal display according to an exemplary embodiment of the present invention will be described in detail with reference to the accompanying drawings.

FIG. 1 is a layout view of a liquid crystal display according to an exemplary embodiment of the present invention.

Referring to FIG. 1, a liquid crystal display includes a display panel 300, a gate driver 400, a data driver 500, a signal controller 600, and the like.

When viewed from a two-dimensional structure, the display panel 300 includes a display area DA in which an image is displayed and a peripheral area PA in which the image is not displayed. In the drawings, an inside of a dotted line quadrangle represents a display area DA and a peripheral portion thereof represents a peripheral area PA. The display panel 300 includes an upper substrate and a lower substrate, and a liquid crystal layer therebetween. The display panel 300 includes several devices for controlling an orientation of liquid crystal molecules and signal lines, such as a gate line and a data line. The display panel 300 includes a plurality of pixels PXs which are connected to the signal line, and which are arranged in a matrix form. The upper substrate and the lower substrate are bonded to each other by a sealing member which is positioned in the peripheral area PA.

To display an image by controlling several elements of the display panel 300, the liquid crystal display includes a gate driver 400, a data driver 500, and a signal controller 600.

The gate driver 400 is connected to gate lines G1 to Gn of the display panel 300 and applies a gate-on voltage to the gate lines G1 to Gn.

The data driver 500 is connected to the data lines D1 to Dm of the display panel 300 so as to apply a data voltage Vd corresponding to an image signal input from the outside to the data lines D1 to Dm. The data driver 500 converts image data into a data voltage using a gray voltage generated by a gray voltage generator.

The signal controller 600 controls the gate driver 400 and the data driver 500. The signal controller 600 receives an image signal from the outside and a control signal therefore, and processes the image signal based on the control signal to be suitable for operational conditions of the display panel 300, and then generates and outputs image data, a gate control signal, a data control signal, a clock signal, and the like.

The gate driver 400, the data driver 500 and the signal controller 600 are each directly mounted in the display panel 300 as an integrated circuit chip or are mounted in a flexible printed circuit film, and thus they may be attached to the display panel 300 or mounted in the separate printed circuit board (PCB) by a tape carrier package (TCP). At least one of the gate driver 400 and the data driver 500 may be integrated in the display panel 300. At least two of the gate driver 400, the data driver 500 and the signal controller 600 may also be integrated in one integrated circuit chip.

Figure 2:
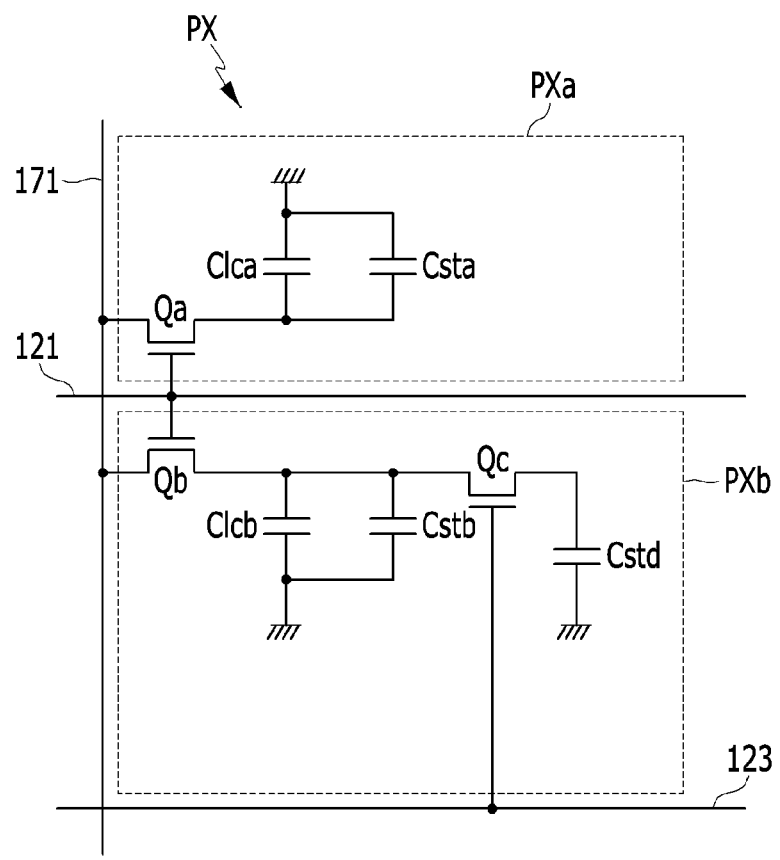
FIG. 2 is an equivalent circuit diagram of one pixel of the liquid crystal display according to the exemplary embodiment of the present invention.
Figure 3:
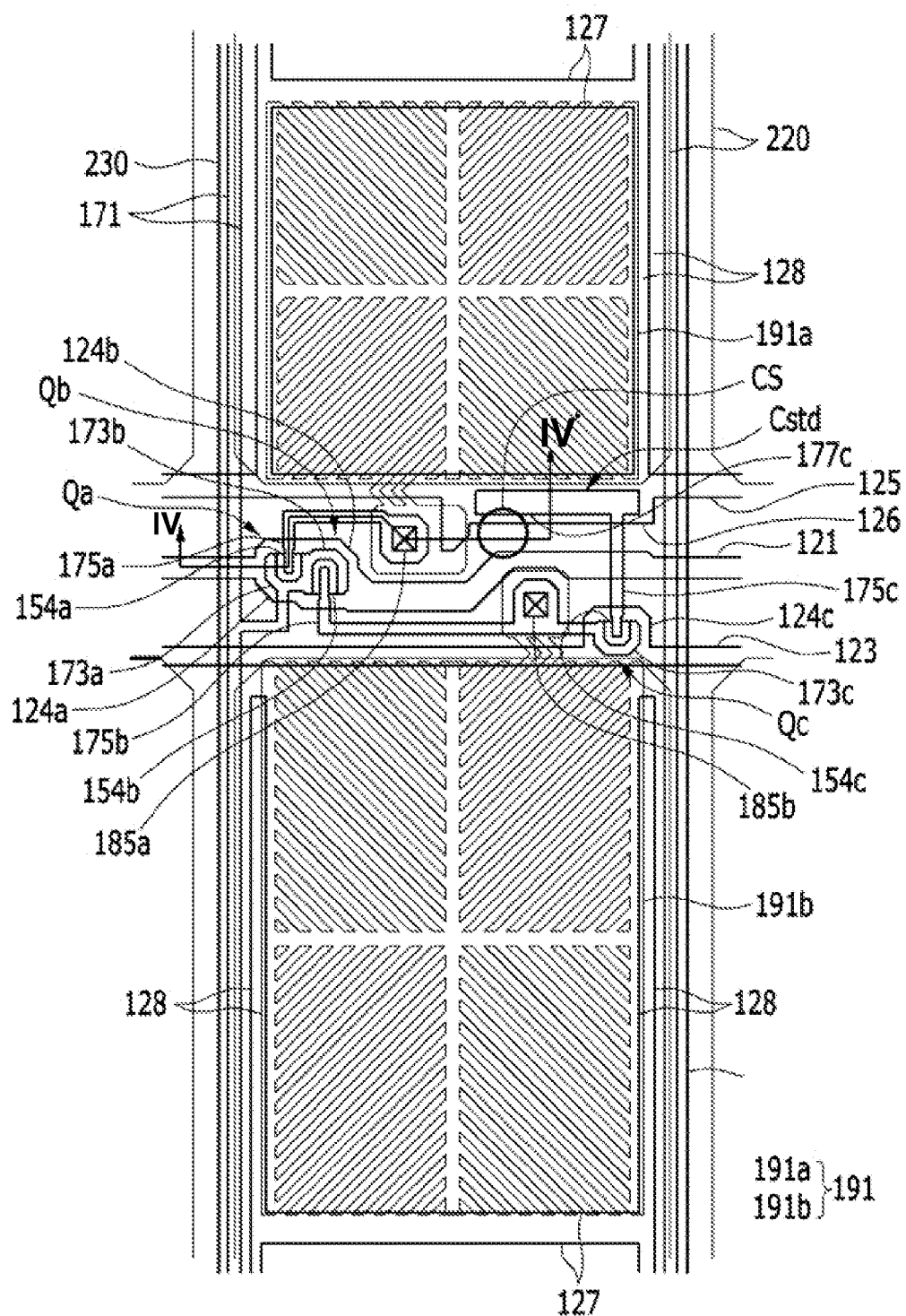
FIG. 3 is a layout view of an example of one pixel of the liquid crystal display according to the exemplary embodiment of the present invention.
Figure 4:
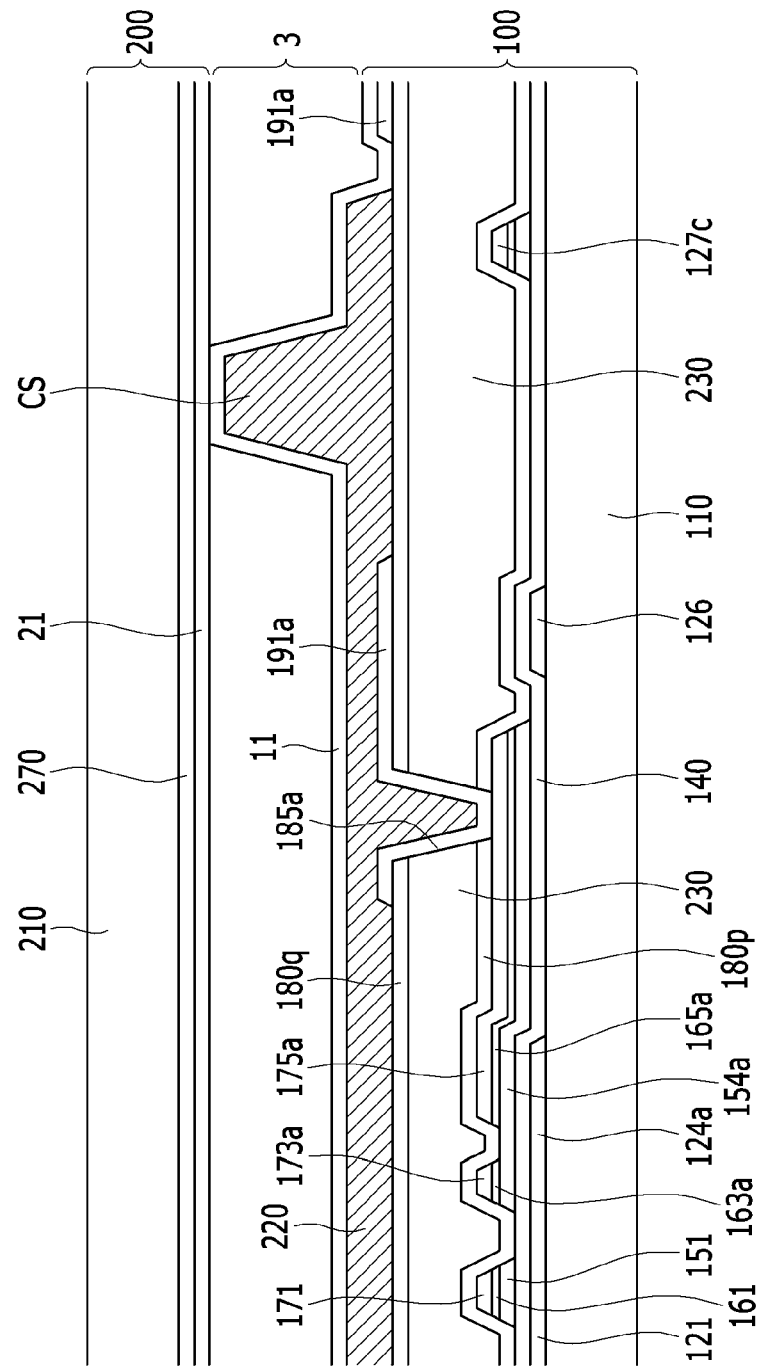
FIG. 4 is a cross-sectional view taken along the cross-sectional line IV-IV' of FIG. 3.

Until now, an overall configuration of the liquid crystal display has been schematically described. Hereinafter, a structure of the display panel 300 will be described in detail. Referring first to FIGS. 2 to 4, the display area DA of the display panel 300 will be described based on a pixel.

FIG. 2 is an equivalent circuit diagram of one pixel of the liquid crystal display according to the exemplary embodiment of the present invention, FIG. 3 is a layout view of an example of one pixel of the liquid crystal display according to the exemplary embodiment of the present invention, and FIG. 4 is a cross-sectional view taken along the cross-sectional line IV-IV' of FIG. 3.

Referring to FIG. 2, the display panel 300 includes a signal line which includes a gate line 121, a step-down gate line 123 and a data line 171, and a pixel PX connected thereto.

The pixel PX includes first and second sub-pixels PXa and PXb. The first subpixel PXa includes a first thin film transistor Qa, a first liquid crystal capacitor Clca, and a first storage capacitor Csta. The second subpixel PXb includes second and third thin film transistors Qb and Qc, respectively, a second liquid crystal capacitor Clcb, a second storage capacitor Cstb, and a step-down capacitor Cstd.

The first and second thin film transistors Qa and Qb, respectively, are each connected to the gate line 121 and the data line 171 and the third thin film transistor Qc is connected to the step-down gate line 123. The control terminal of the first thin film transistor Qa is connected to the gate line 121, the input terminal thereof is connected to the data line 171, and the output terminal thereof is connected to the first liquid crystal capacitor Clca and the first storage capacitor Csta. The control terminal of the second thin film transistor Qb is connected to the gate line 121, the input terminal thereof is connected to the data line 171, and the output terminal thereof is connected to the second liquid crystal capacitor Clcb and the second storage capacitor Cstb. The control terminal of the third thin film transistor Qc is connected to the step-down gate line 123, the input terminal thereof is connected to the second liquid crystal capacitor Clcb, and the output terminal thereof is connected to the step-down capacitor Cstd. The step-down capacitor Cstd is connected to the output terminal of the third thin film transistor Qc and is applied with a common voltage.

Describing the operation of the pixel PX, first, when the gate line 121 is applied with the gate-on voltage, the first and second thin film transistors Qa and Qb, respectively, connected thereto are turned on. Therefore, the data voltage of the data line 171 is applied to the first and second liquid crystal capacitors Clca and Clcb, respectively, through the first and second thin film transistors Qa and Qb, respectively, such that the first and second liquid crystal capacitors Clca and Clcb, respectively, are charged with a difference between the data voltage and the common voltage. In this case, the step-down gate line 123 may be applied with a gate-off voltage.

Next, when the gate line 121 is simultaneously applied with the gate-off voltage Voff and, at the same time, the step-down gate line 123 is applied with the gate-on voltage Von, the first and second thin film transistors Qa and Qb, respectively, connected to the gate line 121 are turned off and the third thin film transistor Qc is turned on. Therefore, the charging voltage of the second liquid crystal capacitor Clcb connected to the output terminal of the second thin film transistor Qb falls. As a result, in the case of the liquid crystal display which is driven with a frame inversion, the charging voltage of the second liquid crystal capacitor Clcb may be always lower than that of the first liquid crystal capacitor Clca. Therefore, the side visibility of the liquid crystal display may be improved by making a charging voltage of the first and second liquid crystal capacitors Clca and Clcb, respectively, different.

Referring to FIGS. 3 and 4, the display panel includes the lower panel 100 and the upper panel 200 which face each other and the liquid crystal layer 3 which is positioned between the two panels 100 and 200.

First describing the lower panel 100, a plurality of gate conductors which include the gate line 121, the step-down gate line 123, and the sustain electrode line 125 are positioned on the lower substrate 110 which may be made of a transparent insulating material such as glass.

The gate line 121 and the step-down gate line 123 mainly extend in a horizontal direction and transfer the gate signals. The gate line 121 may include a first gate electrode 124a and a second gate electrode 124b and the step-down gate line 123 may include a third gate electrode 124c. The first and second gate electrodes 124a and 124b, respectively, are connected to each other. The sustain electrode line 125 may mainly extend in the horizontal direction and transfers a defined voltage, such as the common voltage. The sustain electrode line 125 may include a sustain extension 126, a pair of vertical parts which extend upward while being approximately parallel with the data lines 171, and horizontal parts 127 which connects between the pair of vertical parts 128.

The gate insulating layer 140 is positioned on the gate conductor and a semiconductor 151 is positioned thereon. The semiconductor 151 may extend toward the first and second gate electrodes 124a and 124b, respectively, and includes first and second semiconductors 154a and 154b, respectively, which are connected to each other, and a third semiconductor 154c which is connected to the second semiconductor 154b.

An ohmic contact 161 is formed on the semiconductor 151 and ohmic contacts 163a and 163b are formed on the first semiconductor 154a. An ohmic contact may also be formed on the second semiconductor 154b and the third semiconductor 154c, respectively.

The data conductor, which includes the data line 171, the first drain electrode 175a, the second drain electrode 175b, and the third drain electrode 175c, is formed on the ohmic contacts 163a and 165a. The data line 171 may include the first and second source electrodes 173a and 173b, respectively, which extend toward the first and second gate electrodes 124a and 124b, respectively. The bar-shaped end of the first and second drain electrodes 175a and 175b, respectively, is partially enclosed within the first and second source electrodes 173a and 173b, respectively. A wide one end of the second drain electrode 175b may again extend to form the third source electrode 173c which is bent in a U-shape. A wide end 177c of the third drain electrode 175c overlaps the sustain extension 126 to form the step-down capacitor Cstd, and a bar-shaped end of the third drain electrode 175c is partially enclosed within the third source electrode 173c.

The first gate electrode 124a, the first source electrode 173a, and the first drain electrode 175a form the first thin film transistor Qa, along with the first semiconductor 154a. Similarly, the second gate electrode 124b, the second source electrode 173b, and the second drain electrode 175b form the second thin film transistor Qb, along with the second semiconductor 154b, and the third gate electrode 124c, the third source electrode 173c and the third drain electrode 175c form the third thin film transistor Qc, along with the third semiconductor 154c.

The lower passivation layer 180p is positioned on the data conductors 171, 175a, 175b, and 175c and the exposed semiconductors 154a, 154b, and 154c and the color filter 230 is positioned on the lower passivation layer 180p. The lower passivation layer 180p may include an inorganic insulting layer made of silicon nitride, silicon oxide, or the like. The lower passivation layer 180p may prevent a pigment of the color filter 230 from flowing in the exposed semiconductors 154a, 154b, and 154c. The color filter 230 extends in a vertical direction along two data lines which are adjacent to each other.

An upper passivation layer 180q is positioned on the color filter 230. An upper passivation layer 180q may include an inorganic insulating layer made of silicon nitride, silicon oxide, or the like. The upper passivation layer 180q prevents the color filter from lifting and suppresses the pollution of the liquid crystal layer 3 due to organic materials, such as a solvent flowing in from the color filter 230, thereby preventing defects, such as an afterimage which may occur at the time of driving the screen, from occurring. The plurality of contact holes 185a and 185b, which expose the first drain electrode 175a and the second drain electrode 175b, respectively, are formed on the lower passivation layer 180p, the color filter 230, and the upper passivation layer 180q.

A pixel electrode 191, which includes a first subpixel electrode 191a and a second subpixel electrode 191b, is formed on the upper passivation layer 180q. The pixel electrode 191 is applied with a data voltage through the thin film transistors Qa and Qb which are controlled by the gate signal. The first sub-pixel electrode 191a is applied with the data voltage from the first drain electrode 175a through the contact hole 185a and the second sub-pixel electrode 191b may be applied with the data voltage from the second drain electrode 175b through the contact hole 185b.

The light blocking member 220 is positioned on the upper passivation layer 180q. The light blocking member 220 is often referred to as a black matrix.

A column spacer ('S is positioned on the light locking member 220. The column spacer CS may be made of the same material as the light blocking member 220. The column spacer CS and the light blocking member 220 may be simultaneously formed using a two tone mask, such as a transflective mask. When the column spacer CS for maintaining a cell gap between the lower panel 100 and the upper panel 200 is formed on the lower substrate 110, orientation deficiency of a liquid crystal is reduced due to a misalignment between the lower panel 100 and the upper panel 200, and the like, at the time of implementing the curved display panel, and thus deficiency of image quality, such as the occurrence of texture, may be improved. The light blocking member 220 may be provided with a sub-column spacer (not illustrated) having a height lower than that of the column spacer CS, and the sub-column spacer may be formed simultaneously with the light blocking member 220.

The lower alignment layer 11 is formed on the pixel electrodes 191a and 191b. The alignment layer 11 may include polymer-based materials, for example, at least one of materials such as polyimide, polyamic acid, polysiloxane, nylon, polyvinylalcohol (PVA), and PVC. As a method of forming the alignment layer 11, the polyimide-based alignment layer may be formed by reacting a diamine compound and anhydride in a solvent to apply a solution of synthesized polyamic acid by a printing method (e.g., inkjet printing), and the like, and drying, heating and hardening the applied solution.

Next, describing the upper panel 200, the common electrode 270 is positioned on the upper substrate 210 which may be made of a transparent insulating material, such as glass. The common electrode 270 may be made of a transparent conductive oxide (TCO) such as indium tin oxide (ITO) and indium zinc oxide (IZO), metal, or the like.

The upper alignment layer 21 is formed on the common electrode 270. The upper alignment layer 21 may be made of the same material as the lower alignment layer and may be formed in the same manner as the lower alignment layer.

The first subpixel electrode 191a and the common electrode 270 form the first liquid crystal capacitor Clca, together with the liquid crystal layer 3 therebetween and the second subpixel electrode 191b and the common electrode 270 form the second liquid crystal capacitor Clcb, together with the liquid crystal layer 3 therebetween. The first and second liquid crystal capacitors Clca and Clcb, respectively, sustain the applied voltage after the first and second thin film transistors Qa and Qb, respectively, are turned off. Furthermore, the first and second sub-pixel electrodes 191a and 191b, respectively, overlap the sustain electrode line 125 to form the first and second storage capacitors Csta and Cstb, respectively, Hereinafter, the peripheral area PA of the display panel 300 will be described with reference to FIGS. 5 and 6. Meanwhile, several thin film layers which are formed in the display area DA, described with reference to FIG. 4, are briefly shown as a single layer 150 in FIGS. 5 and 6.

Figure 5:
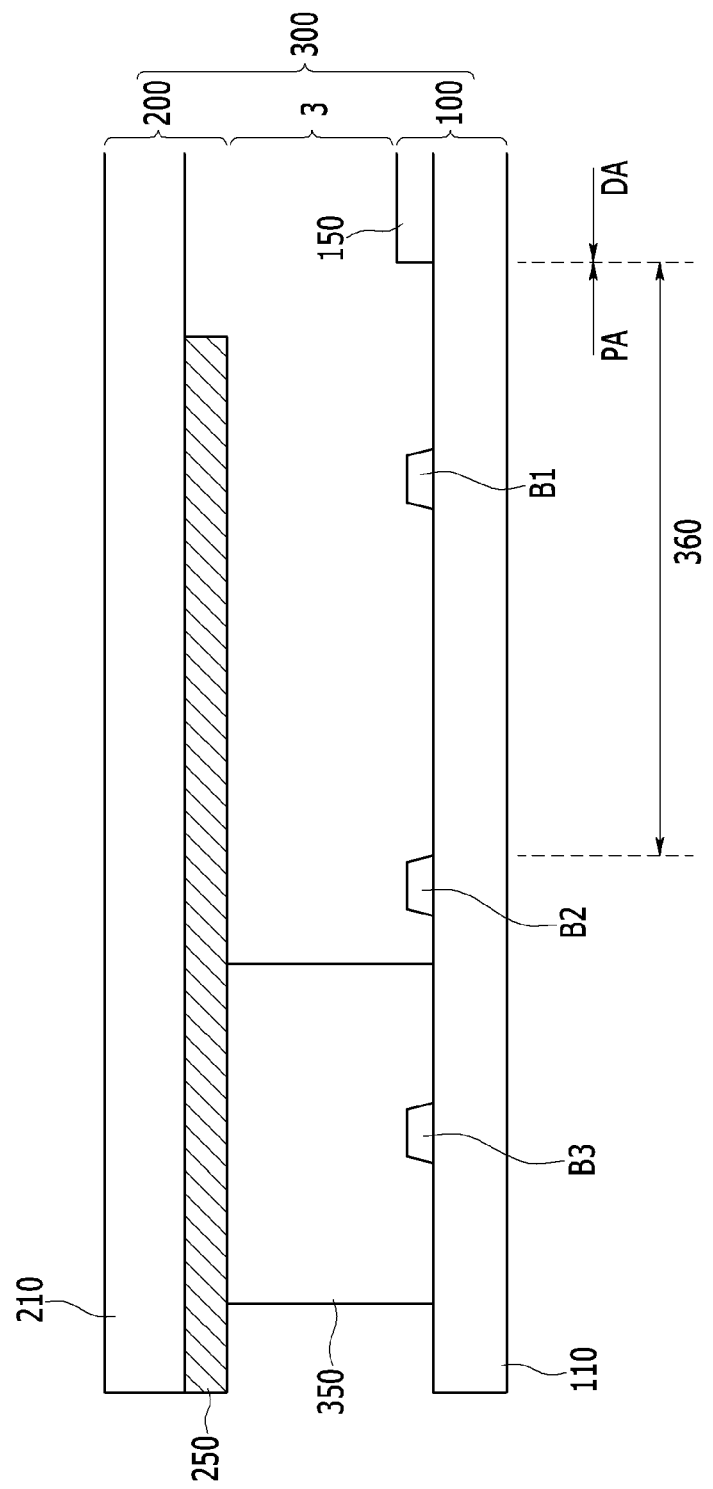
FIG. 5 is a cross-sectional view of the existing liquid crystal display taken along the cross-sectional line V-V' of FIG. 1.

FIG. 5 is a cross-sectional view of the existing liquid crystal display taken along the cross-sectional line V-V' of FIG. 1.

Referring to FIG. 5, the sealing member 350 is positioned in the peripheral area PA in which the lower panel 100 and the upper panel 200 face each other. The sealing member 350 may form a closed curved line by enclosing the display area DA. The sealing member 350 bonds the lower panel 100 to the upper panel 200. The sealing member 350 also prevents the liquid crystal material from being discharged to the outside of the panel or moisture, oxygen, and the like from being permeated into the liquid crystal layer 3 from the outside.

The sealing member 350 may be formed by, for example, applying a sealing material on the lower panel 100 by a printing method, such as a screen print, positioning the upper panel 200, and then irradiating a laser onto a portion coated with a sealing material. The applied sealing material may be a solid-state frit. When a laser is irradiated onto the sealing material, the sealing material is melted and thus adheres to the lower panel 100 and the upper panel 200 like an adhesive and is hardened in a state in which the sealing material adheres to the lower panel 100 and the upper panel 200 so as to form the sealing member 350 which bonds the lower panel 100 to the upper panel 200. Meanwhile, in connection with characteristics of the sealing material, when the laser is irradiated, for example, a gel-state sealing material may also be hardened to form the sealing member 350.

Barriers B1, B2, and B3 are formed on the lower substrate 110. The barrier is to prevent the aligning agent from being spread to the peripheral area PA at the time of applying the aligning agent for forming the lower alignment layer (not illustrated) and may be formed to enclose the display area DA like the sealing member 350.

At least one barrier may be positioned on the lower substrate 110, may be positioned between the sealing member 350 and the display area DA, like the harriers B1 and B2, and may also be positioned in the sealing member 350, like the barrier B3, The aligning agent is generally applied up to the barrier B2 and on the lower substrate 110, and a space between the barrier B2 and the display area DA forms the aligning agent margin part 360.

The barrier B3 is formed to prepare against a case in which the aligning agent overflows the barriers B1 and B2, and it may be positioned approximately in the middle of a width of the sealing member 350 or it may be positioned so as to be closer to the display area DA. The barrier B3 defines a spreading limitation of the aligning agent which may be allowed in a design.

The light blocking member 250 is formed on the upper substrate 210. The light blocking member 250 is formed so as to prevent light from being leaked from the peripheral area PA or light from being reflected from a metal layer. The other light blocking member 220 is formed on the lower substrate 110 and within the display area DA, and therefore, there is no need to form the light blocking member 250 in the display area DA of the upper substrate 210.

Meanwhile, the aligning agent margin part 360 is applied with the aligning agent and is provided with the liquid crystal layer 3, but it is covered by the light blocking member 250 and is not formed with the pixel, and therefore it belongs to the peripheral area PA.

Figure 6:
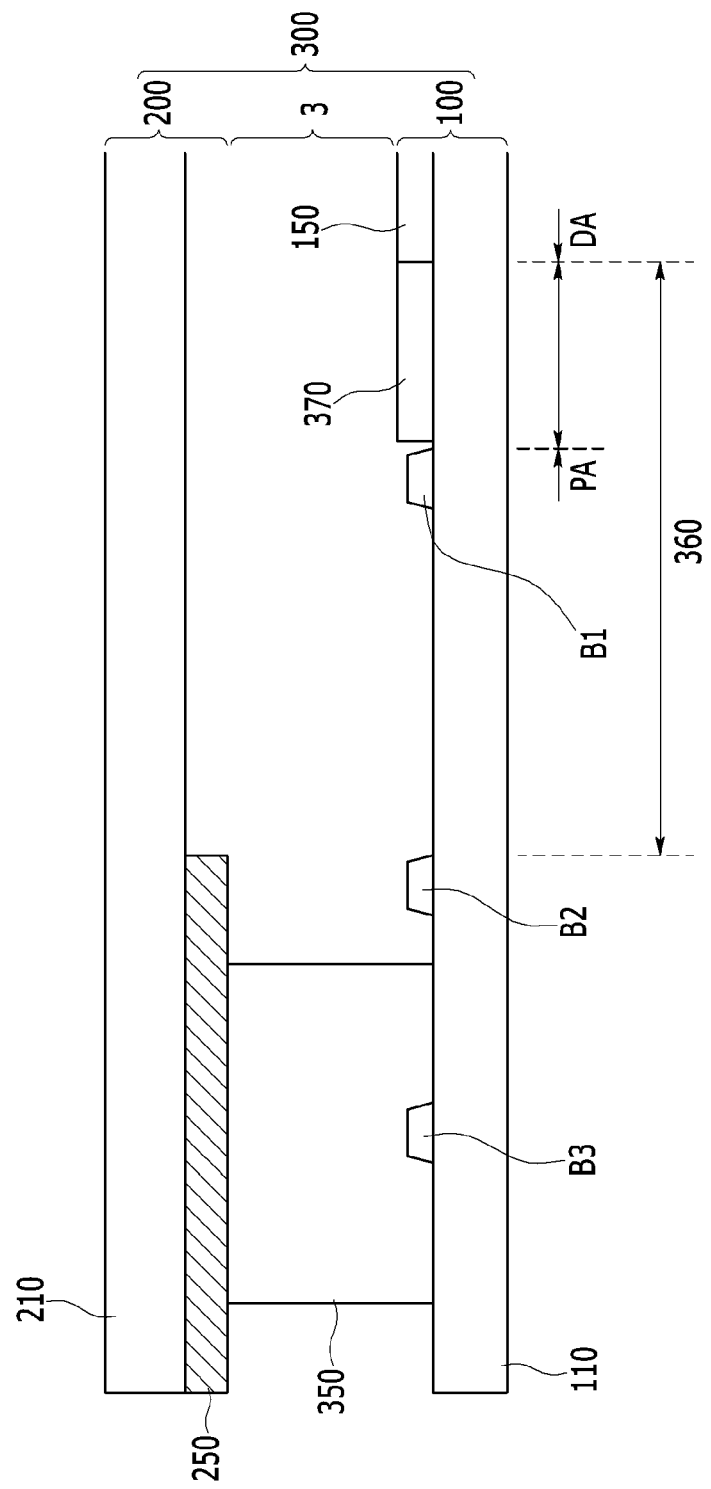
FIG. 6 is a cross-sectional view, taken along the cross-sectional line V-V' of FIG. 1, of the liquid display device according to the exemplary embodiment of the present invention.

FIG. 6 is a cross-sectional view taken along the cross-sectional line V-V' of FIG. 1 of the liquid display device according to the exemplary embodiment of the present invention.

Similar to the one illustrated in FIG. 5, the liquid crystal display of FIG. 6 according to the exemplary embodiment of the present invention includes the upper panel 200 which includes an upper substrate 210 on which a plurality of thin film layers (partially not illustrated) are formed, the lower panel 100 which includes the lower substrate on which the plurality of thin film layers (partially not illustrated) are formed, the liquid crystal layer 3 which is positioned between the upper panel 200 and the lower panel 100, and the sealing member 350 which attaches the upper panel 200 to the lower panel 100 and which constrains the liquid crystal layer 3, wherein the lower panel 100 includes the barriers B1 and B2 which are positioned inside the sealing member 350 on the lower substrate 110.

However, the liquid crystal display according to the exemplary embodiment of the present invention further includes a dummy pixel 370 which is positioned inside the barriers B1 and B2 and encloses the display area DA.

Furthermore, the light blocking member 250 of the liquid crystal display according to the exemplary embodiment of the present invention may be formed between the positions corresponding to a distal end of the aligning agent margin part 360 at a distal end of the upper panel 200 and a distal end of the lower panel 100 on the upper panel 200.

Since the light blocking member 250 is not formed in the aligning agent margin part 360, when the display panel 300 is viewed from the external front, the display panel may seem to be transparent, which reduces the peripheral area PA together with the dummy pixel 370 to be described below so as to expand the display area DA, or which makes the peripheral area PA seem smaller to make the display area DA seem larger.

Hereinafter, the dummy pixel 370 will be described.

The dummy pixel 370 may be formed between the aligning agent margin part 360 or the barrier B1 most adjacent to the display area DA among the plurality of barriers B1, B2, and B3 and the display area DA.

Furthermore, a region between the aligning agent margin part 360 which is a region in which the dummy pixel 370 is formed or the barrier B1 most adjacent to the display area DA among the plurality of barriers B1, B2, and B3, and the display area DA may be the dummy pixel 370 region.

Meanwhile, the dummy pixel 370 may be formed even at the outside of the aligning agent margin part 360.

The dummy pixel means an additional pixel in which the image is not displayed and, similar to the pixels in display area DA, the dummy pixel may be formed with the gate line, the data line, and the thin film transistor connected to the gate line and the data line. The connection of the pixel electrode to the thin film transistor is omitted in the dummy pixel, and thus it may not display an image.

The dummy pixel 370 may include the pixel electrode and the pixel electrode may be a pixel electrode which is formed by an expansion of the pixel electrode at the outermost portion by making the pixel electrode at the outermost portion of the display area (DA) larger.

As described above, when the dummy pixel 370 is positioned in the aligning agent margin part 360 when the dummy pixel 370 includes the pixel electrode, and when the light blocking member 250 is formed only between positions corresponding to distal ends of the aligning agent margin part 360 at the distal end of the upper panel 200 and the distal end of the lower panel 100 on the upper panel 200, the portion where the dummy pixel 370 or the pixel electrode is positioned may appear transparently, so that the peripheral area PA may seem to be reduced and the display area DA may seem to be expanded accordingly.

The dummy pixel may be manufactured by adding the pixel electrode while avoiding the contact hole region of the light blocking member 250 without adding the insulating layer.

When the dummy pixel 370 includes the pixel electrode, the dummy pixel 370 may further include a color filter.

When the dummy pixel further includes the color filter, the dummy pixel displays the same image as the pixel of the outermost portion of the display area DA without receiving the separate image signal, thereby reducing the peripheral area PA while expanding the display area DA so that the peripheral area PA appears to be smaller and the display area DA appears to be larger.

A horizontal length of the dummy pixel 370 may be equal to or more than at least 0.19 mm. Generally, the barrier B1 may be formed so as to be spaced apart from the display area DA by as much as 0.19 mm, and as a result, the dummy pixel 370 may be formed from the display area DA to the place where the barrier B1 is formed.

What is claimed is:

1. A liquid crystal display, comprising:
   an upper panel including an upper substrate on which a plurality of thin film layers are formed;
   a lower panel including a lower substrate on which a plurality of thin film layers are formed;
   a liquid crystal layer positioned between the upper panel and the lower panel; and
   a sealing member bonding the upper panel to the lower panel, and constraining the liquid crystal layer;
   wherein the lower panel includes an aligning agent margin part which is positioned inside the sealing member on the lower substrate, the aligning agent margin part being a region of the lower panel to which an aligning agent used to form an alignment layer is applied; and
   a plurality of dummy pixels which are positioned at the aligning agent margin part and which enclose a display area, wherein the upper panel includes a light blocking member which is positioned between positions corresponding to distal ends of the aligning agent margin part of a distal end of the upper panel and a distal end of the lower panel, wherein the light blocking member is absent from portions of the upper panel corresponding to the dummy pixels.

2. The liquid crystal display of claim 1, wherein a horizontal length of the dummy pixel is equal to or more than at least 0.19 mm.

3. The liquid crystal display of claim 1, wherein the dummy pixel includes a pixel electrode.

4. The liquid crystal display of claim 3, wherein the pixel electrode of the dummy pixel is a pixel electrode by an expansion of the pixel electrode at an outermost portion of the display area, wherein the light blocking member being arranged only in between a peripheral outer edge of the aligning agent margin part and peripheral outer edge of the upper panel.

5. The liquid crystal display of claim 4, wherein the dummy pixel includes a color filter.

6. The liquid crystal display of claim 3, wherein the dummy pixel includes a color filter.

7. A liquid crystal display, comprising:
   an upper panel including an upper substrate on which a plurality of thin film layers are formed;
   a lower panel including a lower substrate on which a plurality of thin film layers are formed;
   a liquid crystal layer positioned between the upper panel and the lower panel;
   a sealing member bonding the upper panel to the lower panel, and constraining the liquid crystal layer, wherein the lower panel includes an aligning agent margin part which is positioned inside the sealing member on the lower substrate; and
   a plurality of dummy pixels which are positioned at the aligning agent margin part and which enclose a display area, wherein the lower panel further includes a plurality of barriers on the lower substrate, at least one of the barriers is positioned inside the sealing member on the lower substrate; and wherein the dummy pixel is formed between a barrier most adjacent to the display area among the plurality of barriers and the display area.

8. The liquid crystal display of claim 7, wherein the dummy pixel includes a pixel electrode.

9. The liquid crystal display of claim 8, wherein the pixel electrode is a pixel electrode by an expansion of the pixel electrode at an outermost portion of the display area.

10. The liquid crystal display of claim 9, wherein the dummy pixel includes a color filter.

11. The liquid crystal display of claim 8, wherein the dummy pixel includes a color filter.

12. The liquid crystal display of claim 7, wherein a horizontal length of the dummy pixel is equal to or more than at least 0.19 mm.

13. The liquid crystal display of claim 7, wherein the upper panel includes a light blocking member which is positioned between positions corresponding to distal ends of the aligning agent margin part of a distal end of the upper panel and a distal end of the lower panel.

14. A liquid crystal display that includes an image producing display area and a peripheral area surrounding the display area, the liquid crystal display comprising:
   an upper panel including a plurality of thin film layers arranged on an upper substrate;
   a lower panel including a plurality of thin film layers arranged on a lower substrate, the lower panel further including a lower alignment layer arranged within the display area and within an aligning agent margin part, the aligning agent margin part corresponding a portion of the peripheral area closest to and adjacent to the display area;
   a liquid crystal layer interposed between the upper panel and the lower panel;

a sealing member arranged to correspond to the peripheral area, the sealing member bonding the upper panel to the lower panel while constraining the liquid crystal layer;

a plurality of dummy pixels arranged to correspond to the aligning agent margin part; and a light blocking member arranged on the upper panel, the light blocking member being arranged to correspond to the sealant, the light blocking member being arranged only external to an outer periphery of the dummy pixels, the dummy pixels not being overlapped by the light blocking member.

15. The liquid crystal display of claim 14, wherein the dummy pixels includes pixel electrodes and a color filter, the dummy pixels displaying a same image as pixels of an outermost portion of the display area without receiving a separate image signal.

16. The liquid crystal display of claim 15, the dummy pixels making the display area appear larger and making the peripheral area appear smaller.

17. The liquid crystal display of claim 14, the light blocking member being arranged only between outer peripheral edges of the aligning agent margin part and an outer peripheral edge of the upper panel.

18. The liquid crystal display of claim 14, wherein the dummy pixels are an extension of pixel electrodes at an outermost portion of the display area, wherein the light blocking layer is arranged on the upper panel only between an outer peripheral edge of the dummy pixels and an outer peripheral edge of the upper panel.

* * * * *